US011329826B2

(12) United States Patent
Myman

(10) Patent No.: US 11,329,826 B2
(45) Date of Patent: May 10, 2022

(54) BLOCKCHAIN-BASED COMMUNICATION SYSTEMS AND METHODS

(71) Applicant: DatChat, Inc., New Brunswick, NJ (US)

(72) Inventor: Darin Myman, New Brunswick, NJ (US)

(73) Assignee: DATCHAT, INC., New Brunswick, NJ (US)

( * ) Notice: Subject to any disclaimer, the term of this patent is extended or adjusted under 35 U.S.C. 154(b) by 344 days.

(21) Appl. No.: 16/736,858

(22) Filed: Jan. 8, 2020

(65) Prior Publication Data

US 2020/0220727 A1 Jul. 9, 2020

Related U.S. Application Data

(60) Provisional application No. 62/790,033, filed on Jan. 9, 2019.

(51) Int. Cl.
*H04L 29/06* (2006.01)
*H04L 9/32* (2006.01)
*G06F 21/62* (2013.01)

(52) U.S. Cl.
CPC ............ *H04L 9/3226* (2013.01); *G06F 21/62* (2013.01); *H04L 63/0428* (2013.01); *H04L 2209/38* (2013.01); *H04L 2209/603* (2013.01)

(58) Field of Classification Search
CPC ............. H04L 63/0428; H04L 2209/38; H04L 2209/603; H04L 9/3226; G06F 21/62
See application file for complete search history.

(56) References Cited

U.S. PATENT DOCUMENTS

| | | | |
|---|---|---|---|
| 2015/0262168 A1* | 9/2015 | Armstrong | G06Q 20/384 |
| | | | 705/39 |
| 2018/0220278 A1* | 8/2018 | Tal | G06Q 20/36 |
| 2019/0333048 A1* | 10/2019 | DiCross | G06Q 20/065 |
| 2019/0354607 A1* | 11/2019 | Snow | H04L 67/10 |
| 2019/0354964 A1* | 11/2019 | Snow | G06F 16/1805 |

OTHER PUBLICATIONS

Ana Reyna et al., On blockchain and its integration with IoT. Challenges and opportunities, Future Generation Computer Systems, vol. 88, 2018, pp. 173-190, ISSN 0167-739X, https://doi.org/10.1016/j.future.2018.05.046. (Year: 2018).*

* cited by examiner

*Primary Examiner* — Chau Le
(74) *Attorney, Agent, or Firm* — McCarter & English, LLP

(57) ABSTRACT

Exemplary embodiments are directed to a blockchain-based communication system. The system includes a public blockchain, a private blockchain and a processing device in communication with the public and private blockchains. The public blockchain includes a database configured to electronically store registration data associated with an originator and at least one recipient. The private blockchain is configured to allow for transmission of data between the originator and the at least one recipient. The processing device is configured to receive a request from the originator to compose a message to be transmitted from the originator to the least one recipient, receive as input and associate at least one digital rights management (DRM) parameter with content of the message, and generate a micro-blockchain within the private blockchain having an originator node associated with the originator and a recipient node associated with the at least one recipient.

20 Claims, 7 Drawing Sheets

BLOCKCHAIN-BASED COMMUNICATION SYSTEMS AND METHODS

CROSS-REFERENCE TO RELATED APPLICATIONS

The present application claims the benefit of priority to U.S. Provisional Patent Application No. 62/790,033, which was filed on Jan. 9, 2019, the entire content of the foregoing provisional application is incorporated herein by reference.

TECHNICAL FIELD

The present disclosure relates to systems and methods for blockchain-based communication that provide additional control and security for an originator of a communication.

BACKGROUND

Blockchain technology has become widespread in the financial industry, particularly in cryptocurrency exchanges. The use of blockchain provides additional security to those involved in the transaction due to the permanent nature of the data associated with the transaction, as well as the decentralized nature of the blockchain distributed ledger and work performed by nodes associated with the blockchain to verify the contents of the blockchain. As the use of blockchain technology becomes more common, the use of such technology in other industries can provide additional advantages.

A need exists for blockchain-based communication systems that provide improved security and control over communication between two or more parties. These and other needs are addressed by the systems and methods of the present disclosure.

SUMMARY

In accordance with embodiments of the present disclosure, an exemplary blockchain-based communication system is provided. The system includes a public blockchain, a private blockchain, and a processing device in communication with the public and private blockchains. The public blockchain includes a database configured to electronically store registration data associated with an originator and at least one recipient. The private blockchain is configured to allow for transmission of data between the originator and the at least one recipient. The processing device is configured to receive a request from the originator to compose a message to be transmitted from the originator to the least one recipient, receive as input and associate at least one digital rights management (DRM) parameter with content of the message, and generate a micro-blockchain within the private blockchain having an originator node associated with the originator and a recipient node associated with the at least one recipient.

The message could include text, a photograph, a video, a document, or combinations thereof. The processing device is configured to execute a validation module of the private blockchain to validate the at least one recipient selected by the originator based on the registration data of the public blockchain. The processing device is configured to execute a validation module of the private blockchain to detect if the at least one recipient selected by the originator is communicatively connected to the system. If the at least one recipient is detected to be communicatively connected to the system, the processing device is configured to transmit the message from the originator node to the recipient node in the micro-blockchain. In such embodiments, the processing device is configured to execute an encryption module of the private blockchain to encrypt the message with a private blockchain encryption prior to transmission of the message from the originator node to the recipient node.

If the at least one recipient is detected to be disconnected from the system, the processing device is configured to transmit the message from the originator node to a distributed storage of the public blockchain. In such embodiments, the processing device is configured to execute a listener module to detect when the at least one recipient is communicatively connected to the system. Upon detection by the listener module that the at least one recipient is communicatively connected to the system, the processing device is configured to execute a transmission module to transmit the message from the distributed storage of the public blockchain to the recipient node. The processing device is configured to execute an encryption module of the public blockchain to encrypt the message with a public blockchain encryption prior to storage of the message in the distributed storage of the public blockchain.

The at least one DRM parameter includes an immutable characteristic, an ephemeral characteristic, or a control characteristic of the message. An originator control of the control characteristic allows for editing or deletion of the message by only the originator after transmission of the message from the originator node to the recipient node. An individual control of the control characteristic allows for editing or deletion of the message by an individual initiating transmission of the message. A consensus control of the control characteristic allows for editing or deletion of the message by a consensus of the originator and the at least one recipient.

In accordance with embodiments of the present disclosure, an exemplary method for blockchain-based communication is provided. The method includes providing a blockchain-based communication system including a public blockchain and a private blockchain. The public blockchain includes a database configured to electronically store registration data associated with an originator and at least one recipient. The private blockchain is configured to allow for transmission of data between the originator and the at least one recipient. The method includes the step of receiving a request via a processing device from the originator to compose a message to be transmitted from the originator to the least one recipient. The processing device is in communication with the public blockchain and the private blockchain. The method further includes the steps of receiving as input and associating at least one digital rights management (DRM) parameter with content of the message using the processing device, and generating a micro-blockchain with the processing device within the private blockchain having an originator node associated with the originator and a recipient node associated with the at least one recipient.

The method further includes the steps of executing a validation module of the private blockchain with the processing device to detect if the at least one recipient selected by the originator is communicatively connected to the system, transmitting the message from the originator node to the recipient node in the micro-blockchain if the at least one recipient is detected to be communicatively connected to the system, transmitting the message from the originator node to a distributed storage of the public blockchain if the at least one recipient is detected to be disconnected from the system, and executing a listener module to detect when the at least one recipient is communicatively connected to the system.

Upon detection by the listener module that the at least one recipient is communicatively connected to the system, the method includes the step of executing a transmission module to transmit the message from the distributed storage of the public blockchain to the recipient node.

In accordance with embodiments of the present disclosure, and exemplary non-transitory computer-readable medium storing instructions for blockchain-based communication is provided. The instructions are executable by a processing device. Execution of the instructions by the processing device causes the processing device to provide a blockchain-based communication system including a public blockchain and a private blockchain. The public blockchain includes a database configured to electronically store registration data associated with an originator and at least one recipient. The private blockchain is configured to allow for transmission of data between the originator and the at least one recipient. Execution of the instructions by the processing device causes the processing device to receive a request via the processing device from the originator to compose a message to be transmitted from the originator to the least one recipient. The processing device is in communication with the public blockchain and the private blockchain. Execution of the instructions by the processing device causes the processing device to receive as input and associate at least one digital rights management (DRM) parameter with content of the message using the processing device. Execution of the instructions by the processing device causes the processing device to generate a micro-blockchain with the processing device within the private blockchain having an originator node associated with the originator and a recipient node associated with the at least one recipient.

BRIEF DESCRIPTION OF THE DRAWINGS

To assist those of skill in the art in making and using the disclosed blockchain-based communication systems and methods, reference is made to the accompanying figures, wherein.

DESCRIPTION OF EXEMPLARY EMBODIMENTS

In accordance with embodiments of the present disclosure, exemplary blockchain-based communication systems are provided that use a public blockchain and a private blockchain in combination to ensure deliverability of data, security, and control of content. The exemplary systems allow for sharing of messages and/or any type of data (e.g., photographs, videos, documents, combinations thereof, or the like). The exemplary systems can be used to create and share private archives of information for which all participants contribute and share data (e.g., private family archives). The exemplary systems can act as private social networks with distributed storage providing control over the shared content. In some embodiments, the public blockchain can be used to register and validate users (originators and/or recipients) and the private blockchain can be used to generate, encrypt and transmit messages between the originator and one or more recipients. In some embodiments, digital rights management (DRM) logic can include whether the originator of the message has sole control of the generated data, all participants have control of the generated data, a consensus of the participants is used to control the generated data, or the like.

Figure 1:
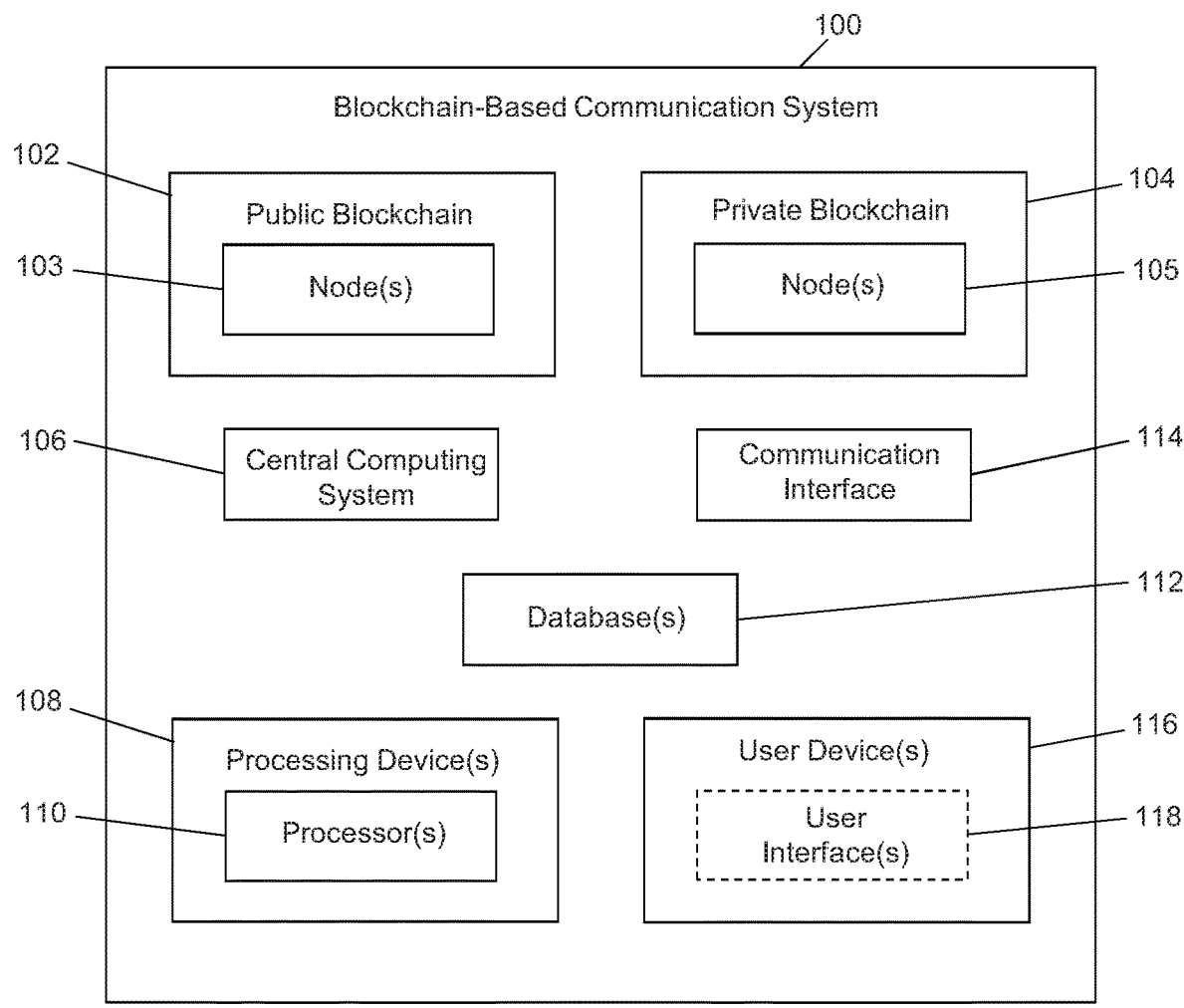
FIG. 1 is a block diagram of an exemplary blockchain-based communication system in accordance with the present disclosure.

With reference to FIG. 1, a block diagram of an exemplary blockchain-based communication system 100 (hereinafter "system 100") is provided. The system 100 includes a public blockchain 102 and a private blockchain 104. In some embodiments, the public and private blockchains 102, 104 can each include one or more micro nodes 103, 105. The system 100 includes a central computing system 106 configured to process data related to the public and/or private blockchains 102, 104. In some embodiments, one or more processing devices 108 having one or more processors 110 can be used to process data related to the public and/or private blockchains 102, 104. The data associated with the public and/or private blockchains 102, 104 can be electronically stored in one or more databases 112. Any type of hardware arrangement can be utilized to process the data associated with the public and/or private blockchains 102, 104 in the manner described herein. In some embodiments, the central computing system 106, the processing devices 108, local devices, combinations thereof, or the like, can be used to process the data associated with the public and/or private blockchains 102, 104.

The system 100 can include a communication interface 114 that provides for communication between the components of the system 100. For example, the communication interface 114 can transmit and/or receive data between the public and private blockchains 102, 104, and can transmit such data to the central computing system 106 for processing. The system 100 can include one or more user devices 116 having a user interface 118 (e.g., an originator device, recipient devices, or the like).

Figure 2:
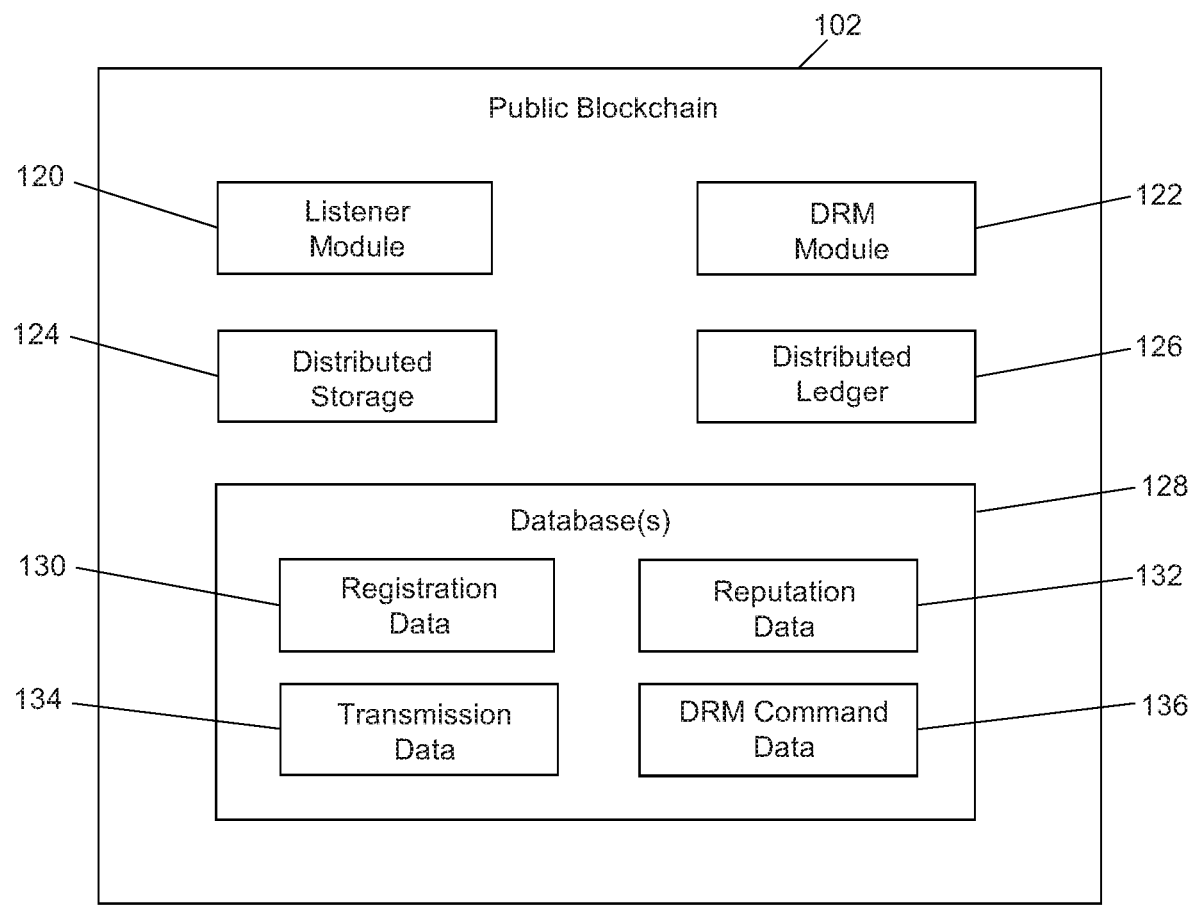
FIG. 2 is a block diagram of a public blockchain of an exemplary blockchain-based communication system of FIG. 1.

With reference to FIG. 2, a block diagram of the public blockchain 102 is provided. The public blockchain 102 can be used to ensure reliability of the peer-to-peer network provided by the system 100. The public blockchain 102 can be in the form of a node (e.g., a micro node) having a listener module 120, a DRM module 122, a distributed storage 124, and a distributed ledger 126. In some embodiments, the public blockchain 102 can include multiple micro nodes each having the listener module 120, the DRM module 122, the disturbed storage 124, and the distributed ledger 126. Although shown as incorporated into the public blockchain 102, in some embodiments, the listener module 120, DRM module 122, distributed storage 124 and/or distributed ledger 126 can be separate from the public blockchain 102 and configured to process the data associated with the public blockchain 102 (e.g., by execution with the central computing system 106 and/or the processing device 108).

The public blockchain 102 can include one or more databases 128 electronically storing data related to the public blockchain 102. In some embodiments, the databases 128 can be incorporated into the distributed storage 124. A user (originator and/or recipient) can register a device or account with the pubic blockchain 102, and such data can be electronically stored in the database 128 as registration data 130. The registration data 130 can include, e.g., the name of the user, the blockchain address associated with the user, a user name, a public key, a telephone number, an e-mail address, an IP address, a physical address, an image, combinations thereof, or the like. In some embodiments, the registration data 130 can be electronically stored in the distributed ledger 126.

Based on data collected during interaction of the registered user with the system 100, reputation data 132 associated with the user can be electronically stored in the database 128. In some embodiments, the reputation data 132 can include, e.g., complaints of spam messages transmitted by the user, connection reliability of the user to the system 100, or the like. Spam complaints can include the number of instances of an originator or recipient transmitting data that is considered to be spam. Connection reliability can include data regarding the strength or continuity in connection of a user to the system 100. In some embodiments, the distributed ledger 126 can electronically store public encryption data (e.g., encryption and decryption keys for data stored in and associated with the public blockchain 102).

As will be discussed in greater detail below, in instances of transmitting correspondence from an originator to a recipient in which the recipient is not currently connected to the system 100, the correspondence can be electronically stored in the public blockchain 102 as transmission data 134. The transmission data 134 can be stored in an encrypted form. The listener module 120 can be executed by the central computing system 106 and/or processing device 108 of the system 100 in a substantially continuous manner or at predetermined time intervals to determine if the recipient of the stored transmission data 134 has connected to the system 100. If the recipient has not connected to the system 100, the public blockchain 102 can continue to store the transmission data 134 in the database 128.

Upon detection of the recipient connected to the system 100 by the listener module 120, the transmission data 134 intended for the recipient can be electronically transmitted to the recipient through the private blockchain 104. Upon transmission of the transmission data 134 to the recipient through the private blockchain 104, the corresponding transmission data 134 can be deleted from the database 128. In some embodiments, one or more nodes of the public blockchain 102 can be rewarded for acting as the delivery mechanism of the transmission data 134 and maintaining the distributed ledger 126 using, e.g., cryptocurrency, or the like. Mining of a cryptocurrency token for processing of digital rights, data delivery and/or user verification can ensure the reliability of the decentralizing correspondence blockchain.

In some embodiments, a DRM module 122 can be executed by the central computing system 106 and/or the processing device 108 to assign DRM rights to the transmission data 134. The DRM rights can include, e.g., whether the originator has sole control rights of the transmitted data, whether the recipient and originator share control rights of the transmitted data, viewing limitations of the transmitted data (e.g., viewable a limited number of times), timing limitations of the transmitted data (e.g., viewable for a limited time period from transmission), forwarding limitations of the transmitted data (e.g., inability to forward to other users, ability to forward to other users only once) combinations thereof, or the like. The DRM rights generated by the DRM module 122 can be electronically stored as DRM command data 136, and are electronically connected to the corresponding transmission data 134. During transmission of the transmission data 134 to the recipient, the DRM rights associated with the transmission data 134 can also be transmitted through the private blockchain 104 and deleted from the public blockchain 102.

Figure 3:
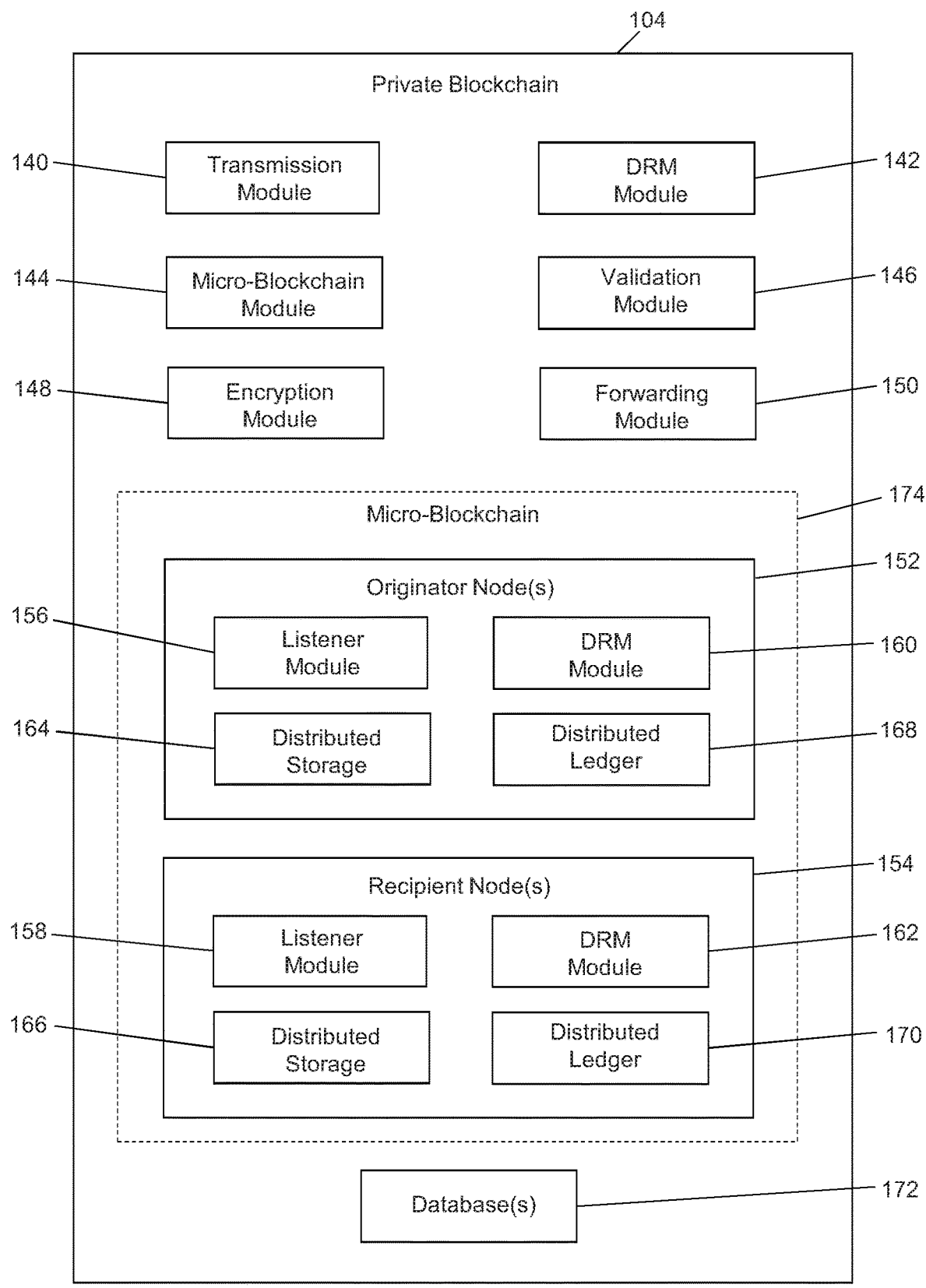
FIG. 3 is a block diagram of a private blockchain of an exemplary blockchain-based communication system of FIG. 1.

With reference to FIG. 3, a block diagram of the private blockchain 104 is provided. The private blockchain 104 includes a transmission module 140, a DRM module 142, a micro-blockchain module 144, a validation module 146, an encryption module 148, and a forwarding module 150. The private blockchain 104 can include one or more originator nodes 152 (e.g., micro nodes) and one or more recipient nodes 154 (e.g., micro nodes). Each of the nodes 152, 154 includes a listener module 156, 158, a DRM module 160, 162, a distributed storage 164, 166, and a distributed ledger 168, 170. Although shown as incorporated into the private blockchain 104, in some embodiments, the transmission module 140, DRM module 142, micro-blockchain module 144, validation module 146, encryption module 148, listener module 156, 158, DRM module 160, 162, distributed storage 164, 166 and/or distributed ledger 168, 170 can be separate from the private blockchain 104 and configured to process the data associated with the private blockchain 104 (e.g., by execution with the central computing system 106 and/or the processing device 108). The private blockchain 104 can include one or more databases 172 for electronically storing data associated with the private blockchain 104. In some embodiments, one or all portions of the databases 172 can be incorporated into the distributed storage 164, 166.

The private blockchain 104 provides a communication platform for transmission of any type of data, such as messages, photographs, videos, documents, or the like. The private blockchain 104 enables the originator to exercise control over data transmitted between the originator node 152 and the recipient nodes 154 after the data has been transmitted to the recipient nodes 154. The private blockchain 104 provides a "one-click" creation of a permissioned micro-blockchain 174 in which each correspondence thread can be a separate chain. For example, each group of individuals or chain of correspondence can be maintained in a micro-blockchain 174 having an originator node 174 and one or more recipient nodes 154. The DRM module 160 can be executed by the central computing system 106 and/or the processing device 108 (e.g., of the user device 116) to set digital rights to the correspondence chain and the digital content involved.

The transmission module 140 can be executed by the central computing system 106 and/or the processing device 108 to electronically transmit data between the originator and recipient nodes 152, 154. The micro-blockchain module 144 can be executed by the central computing system 106 and/or the processing device 108 to create a new transmission thread or chain between the originator and recipient nodes 152, 154. The validation module 146 can be executed by the central computing system 106 and/or the processing device 108 to ensure that the recipient node 154 selected by the originator node 152 is registered with the public blockchain 102. If the recipient node 154 is connected to the system 100 and registered with the public blockchain 102, the validation module 146 can transmit the public blockchain 102 encryption key to the recipient node 154. The DRM module 142 can be executed by the central computing system 106 and/or the processing device 108 to establish digital rights rules of the transmitted data.

The respective DRM modules 160, 162 of the originator and recipient nodes 152, 154 can be executed by the central computing system 106 and/or the processing device 108 in combination with the DRM module 142 to establish digital rights rules for data between generated by the originator or recipient. For example, if the originator node 152 is generating and transmitting data to the recipient node 154, the DRM module 160 can be executed to establish the digital rights rules of such data. As a further example, if the recipient node 154 is generating and transmitting data to the originator node 152 (or other recipient nodes 154), the DRM module 162 can be executed to establish the digital rights rules of such data. The DRM modules 160, 162 can thereby manage and maintain the respective sender and receiver DRM instructions.

The DRM modules 160, 162 also provide versatility to the user in that the creator of a correspondence/transmission thread or the transmitter of data in an existing correspondence/transmission thread can set various parameters for the thread. In some embodiments, the parameters include, e.g., enabling the thread to exist permanently (e.g., for document retention), permitting the originator to limit the recipients who can view the data (e.g., only certain recipients in a thread can view the data), permitting the originator to limit what the recipients can do with the data (e.g., view only, view and reply, view and forward, view and store/save), and enabling the entire transmission chain to be deleted from the private blockchain 104 (e.g., by the originator only, by a consensus of participants in the thread, or the like).

The DRM rules can be modified by the originator node 152 at any time before or after transmission of the data to a recipient node 154. The DRM rules set by the originator 152 can apply to both current and future members of the thread or group. The DRM rules can be used to restrict access to the data to some members, allow access to the data to all members, or a hybrid setting. In some embodiments, sharing of existing data in the thread with a new member (e.g., recipient) of the group can require permission from the originator node 152. Such permission can encrypt and transmit the data to the new recipient node 154.

The encryption module 148 can be executed by the central computing system 106 and/or the processing device 108 to encrypt the data transmitted between the originator and recipient nodes 152, 154 with the private blockchain 104 encryption key. The distributed ledgers 168, 170 can electronically store the encryption key(s), meta data associated with the transmitted data, combinations thereof, or the like. The meta data can include, e.g., time stamps when data is transmitted, time stamps when data is forwarded, time stamps when data is accessed, opened or read, or the like. All messages transmitted and received can be stored in the distributed storage 164, 166 of the originator and recipient nodes 152, 154.

Encryption can be performed by the private blockchain 104 and, in some embodiments, by both the public and private blockchains 102, 104 for additional security. The system 100 can therefore electronically store encryption keys for both the public and private blockchain 102, 104 encryption. The private blockchain 104 encryption key can be used to encrypt the data such that the originator maintains control over the correspondence thread. Each piece of data transmitted by the originator or the recipient through the private blockchain 104 can be encrypted for each member of the private blockchain 104 individually prior to delivering the data to the intended recipient. The originator and recipient nodes 152, 154 can each serve as ledgers, servers and clients. The system 100 can request that a new recipient node 154 desiring to join an existing correspondence chain (e.g., micro-blockchain 174) between the originator node 152 and one or more recipient nodes 154 (thereby receiving access to previously transmitted data) must first be approved by the consensus of the members of the correspondence chain or by the originator node 152.

The listener modules 156, 158 can electronically connect with the public and private blockchains 102, 104 to ensure transmission of data is achieved. For example, when data is transmitted from the originator node 152, the listener module 156 can communicate with the public blockchain 102 to ensure that the intended recipient node 154 is connected to the system 100. If the intended recipient node 154 is connected to the system 100, the data can be transmitted to the recipient node 154. If the intended recipient node 154 is not connected to the system 100, the DRM module 160 can provide instructions for delivery of the data to the recipient node.

Such instructions can include maintaining the transmitted data in the transmitted data 134 of the public blockchain 102 with the listener module 120 of the public blockchain 102 monitoring the connection status of the intended recipient node 154. When the intended recipient node 154 connects to the system 100, the public blockchain 102 can transmit the stored transmission data 134 to the intended recipient node 154. In some embodiments, the forwarding module 150 can be executed by the central computing system 106 and/or the processing device 108 to transmit the stored transmission data 134 to the intended recipient node 154 upon detection by the listener module 120 (and/or listener modules 156, 158) that the recipient node 154 is connected to the system 100.

In some embodiments, rather than transmitting data through the public blockchain 102, data can be transmitted from the originator node 152 to the recipient node 154 (or vice versa) when both the originator and recipient nodes 152, 154 are connected to the system 100, thereby bypassing the public blockchain for storage of data. In some embodiments, rather than transmitting data through the public blockchain 102, the listener module 156, 158 of a user node can act as a listener in a peer-to-peer network environment to determine when the intended recipient node 154 is connected to the system 100. In such environments, the data to be transmitted can be stored in the distributed storage 164 of the originator node 152. Upon connection to the system 100, the listener module 158 of the recipient node 154 can connect with the private blockchain 104 to determine if any data is pending for transmission to the recipient node 154. If the listener module 158 detects such data, the data can be automatically transmitted to the recipient node 154.

The private blockchain 104 therefore provides for specific permissions, privacy features, and controls of the data transmitted between the originator and recipient nodes 152, 154. In some embodiments, certain identity management functions can be performed by the public blockchain 102. As noted above, the validation module 146 can be executed to validate users desiring to join the private blockchain 104. Upon initiation of generating a transmission using the micro-blockchain module 144, the validation module 146 can determine if the intended recipient node 154 is connected to the system 100, as well as the registration data 130 and reputation data 132 associated with the recipient node 154. Upon validating the recipient node 154 for the initial transmission of data, future transmission of data between the validated recipient node 154 and the originator node 152 can occur without additional validation steps. In some embodiments, such future transmission of data is periodically validated after the initial trust has been established.

If the recipient node 154 is connected to the system 100, the encrypted content can be transmitted directly to the recipient node 154. If the recipient node 154 is not connected to the system 100, the encrypted content can be transmitted to a decentralized storage device (e.g., the distributed storage 124 and/or the database 128) associated with the public blockchain 102. The listener mode 120 detects when the recipient node 154 connects to the system 100 and, upon such detection, transfers the encrypted content to the recipient node 154.

Figure 4:
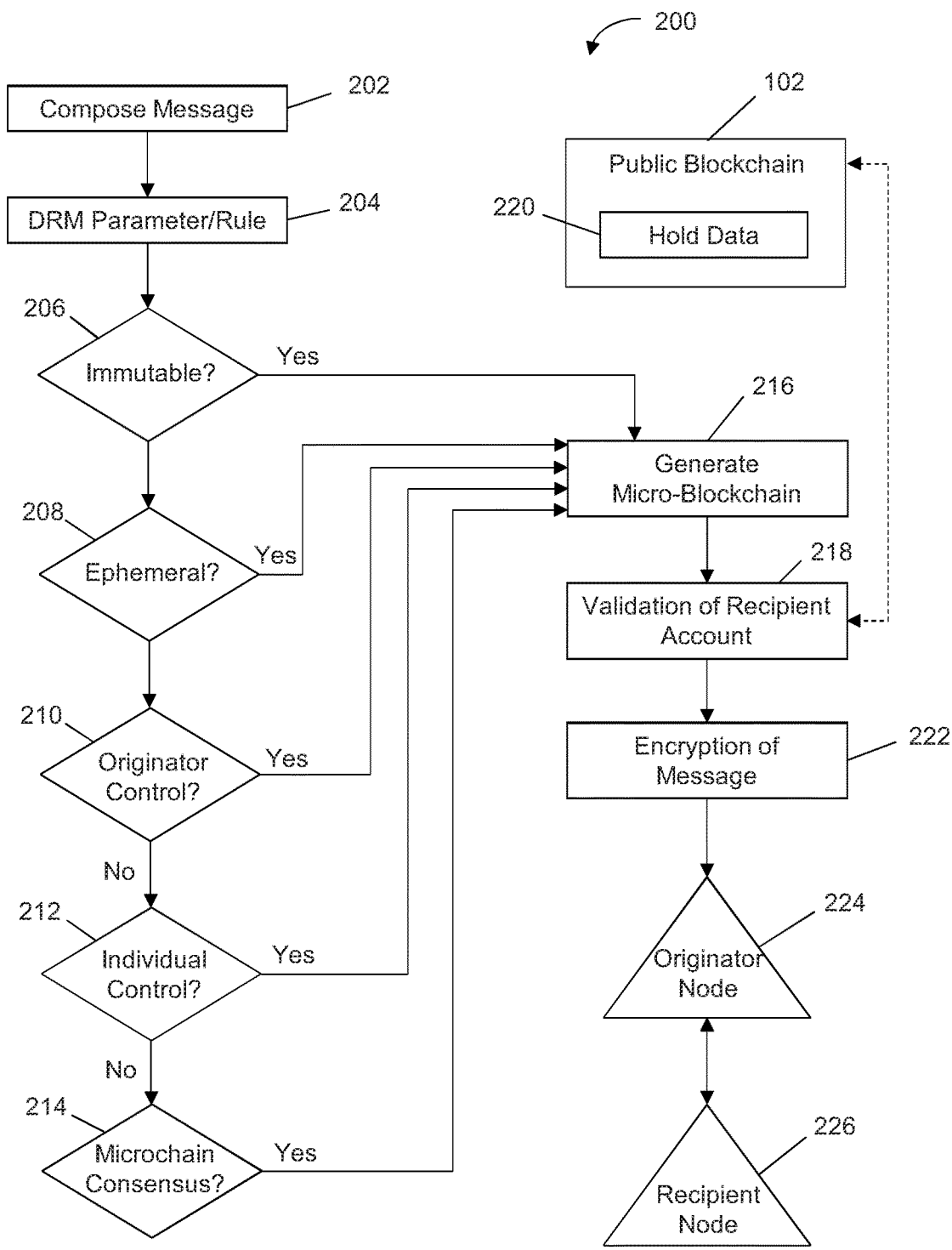
FIG. 4 is a flowchart illustrating an exemplary process of implementing a blockchain-based communication system in accordance with the present disclosure.

With reference to FIG. 4, a flowchart illustrating an exemplary process 200 of implementing the system 100 is provided. At step 202, a message is composed by the originator at the originator device in the form of any data capable of being transmitted between the originator and recipient nodes. The data can include, e.g., a message, a document, a photograph, a video, combinations thereof, or the like. The originator also selects one or more intended recipients of the data. At step 204, DRM parameter(s) or rule(s) can be established and associated with the composed message. The DRM parameter(s) or rules(s) can include restrictions regarding viewing (e.g., the number of allowed views, the time period for viewing, or the like), transferring, and/or saving the transmitted content.

Steps 206-214 can be performed as a continuation of step 204. At step 206, the originator can indicate whether the content to be transmitted is immutable (e.g., capable of being edited or changed over time after initial transmission by the originator). If the content is to be immutable and no other DRM parameter(s) or rules(s) are to be established, the process 200 can continue to step 216 for generation of a micro-blockchain (e.g., a private blockchain). If additional DRM parameter(s) or rules(s) are to be established, at step 208, the originator can indicate whether the content to be transmitted is ephemeral (e.g., lasting for a short period of time and being automatically deleted from the private blockchain after the established time). If the content is ephemeral, the originator can indicate the time period after which the content is to be deleted from the private blockchain. If no other DRM parameter(s) or rules(s) are to be established, the process 200 can continue to step 216 for generation of the micro-blockchain.

If additional DRM parameter(s) or rules(s) are to be established, at step 210, the originator can indicate whether only the originator is to have control over the content after the data has been transmitted to the recipient nodes. The control includes editing of data, deletion of data, forwarding of data, modifying viewing rights associated with the data, modifying transferability rights associated with the data, modifying saving rights associated with the data, deletion of the entire transmission chain, or the like. The control rights include control over data transmitted by the originator and the recipients of the group. If the originator is to have control of the data after transmission, the process 200 can continue to step 216 for generation of the micro-blockchain.

If the originator does not have sole control over the transmitted content, at step 212, the originator can indicate whether each individual (originator and recipient node(s)) of the micro-blockchain will have control over their respective transmitted data. For example, the originator would maintain all control rights associated with data transmitted within the micro-blockchain by the originator, without the ability to control the data transmitted by the recipients. As a further example, each recipient would maintain all control rights associated with data transmitted within the micro-blockchain by the recipient, without the ability to control the data transmitted by the originator or other recipients. If each individual of the micro-blockchain is to have control of the data after transmission, the process 200 can continue to step 216 for generation of the micro-blockchain.

If the individual does not have control of his or her transmitted data, at step 214, the originator can indicate whether a consensus of the participants of the micro-blockchain is needed to control and take action with respect to the transmitted data. In such embodiments, the majority of the participants of the micro-blockchain shall agree to take action with respect to the transmitted data before the action can occur. In a micro-blockchain having only an originator and a single recipient, both the originator and recipient must agree before any action is taken with the transmitted data. If a consensus of the participants of the micro-blockchain is needed to have control of the data after transmission, the process 200 can continue to step 216 for generation of the micro-blockchain.

At step 216, the micro-blockchain can be generated based on the composed message and any DRM parameter(s) or rules(s) selected by the originator. At step 218, the system can validate each of the recipients selected by the originator to receive the data to be transmitted. Validation can be performed by communicating with the registration data stored in the public blockchain 102 to ensure that the recipient is registered with the system. The validation step can also determine if the recipients are connected to the system and capable of receiving the transmitted data. If a recipient is not connected to the system, at step 220, the data to be transmitted can be electronically stored in the public blockchain 102 until the recipient connects to the system. The data can be encrypted using the public blockchain 102 encryption key to maintain the data secure within the public blockchain 102. Upon connection to the system by the recipient, the encrypted data and public blockchain encryption key can proceed to step 222. In some embodiments, the user's public key can be used for encryption in both the public and private blockchains 102, 104. In such embodiments, upon connection to the system, the encrypted data (e.g., message) can be transmitted to the recipient and deleted from the public blockchain 102.

For the remaining recipients connected to the system (if any), the process can proceed to step 222. At step 222, the data to be transmitted can be encrypted using the private micro-blockchain encryption key. In some embodiments, the user's public key can be used for encryption of the data. The data can be encrypted for each recipient. In some embodiments, the encryption key for each recipient can be the same. In some embodiments, the encryption key for each recipient can be different. For data initially held at step 220, such data can include both a public and private encryption key. At steps 224, 226, the originator and recipient nodes are generated and transmission of data from the originator to the recipient node is performed.

Upon transmitting the initial data set to the recipient node, the communication channel between the originator and recipient nodes can be established, allowing for subsequent transmission of data. Each action to transmit data between the originator and recipient nodes can be performed using steps 202-222. In some embodiments, the validation step 218 can be performed only at the initial validation stage (and for each new recipient added to the micro-blockchain). In some embodiments, the validation step 218 can be performed periodically for new and previously validated recipients. The recipient node can request permission from the originator node to forward data received from the originator. If permission is granted by the originator node, the encryption step 222 can be performed on the new transmission and transmitted from the originator node to the new recipient.

Figure 5:
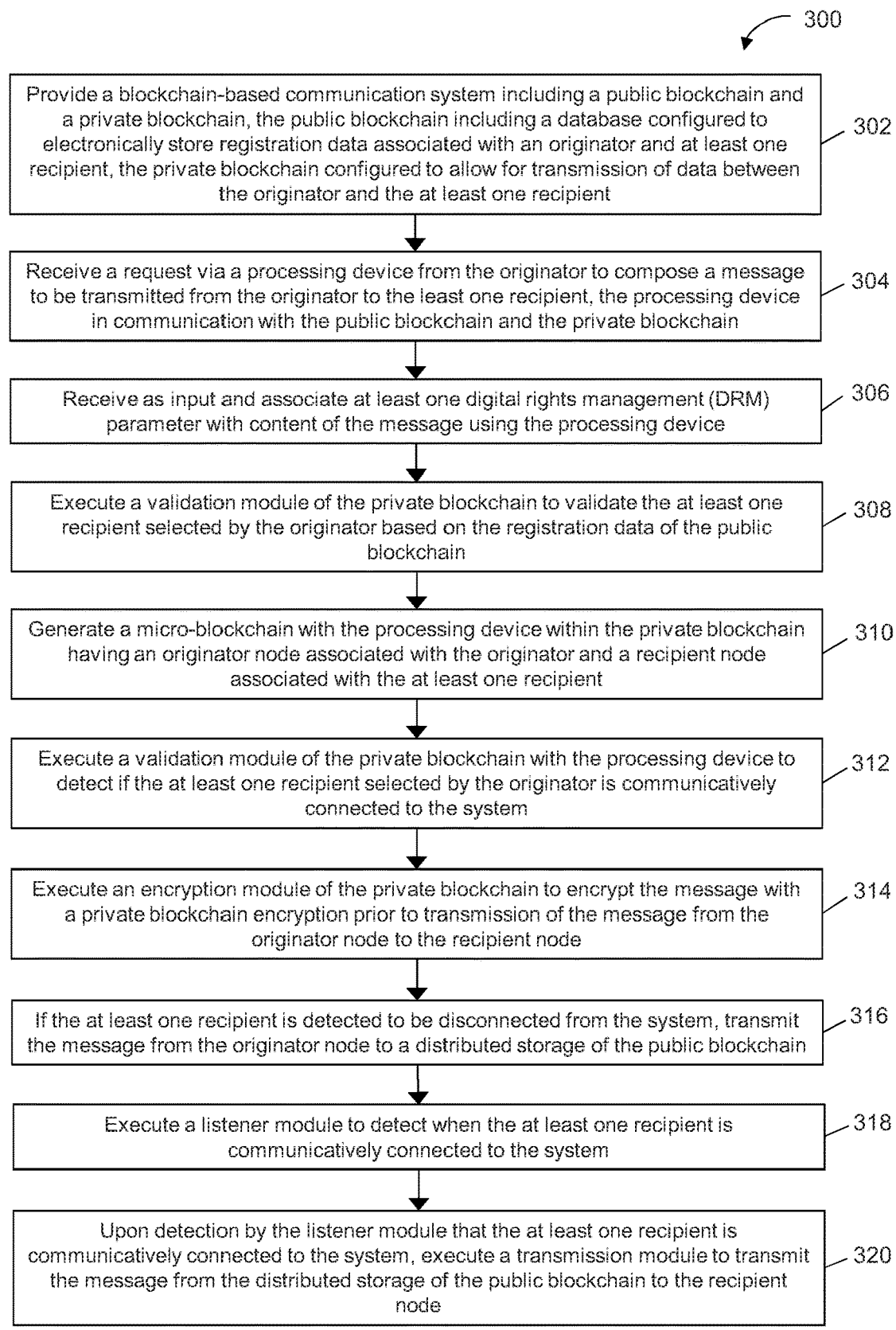
FIG. 5 is a flowchart illustrating an exemplary process of implementing a blockchain-based communication system in accordance with the present disclosure.

With reference to FIG. 5, an exemplary process 300 of implementing the system 100 is provided. To begin, at step 302, a block-chain based communication system is provided that includes a public blockchain and a private blockchain. The public blockchain includes a database configured to electronically store registration data associated with an originator and at least one recipient. The private blockchain is configured to allow for transmission of data between the originator and the at least one recipient. At step 304, a request is received via a processing device from the originator to compose a message to be transmitted from the originator to the at least one recipient. The processing device is in communication with the public blockchain and the private blockchain.

At step 306, at least one digital rights management parameter is received as input and associated with content of the message using the processing device. At step 308, a validation module of the private blockchain is executed to validate the at least one recipient selected by the originator based on the registration data of the public blockchain. At step 310, a micro-blockchain is generated with the processing device within the private blockchain having an originator node associated with the originator and a recipient node associated with the at least one recipient. At step 312, a validation module of the private blockchain is executed with the processing device to detect if the at least one recipient selected by the originator is communicatively connected to the system.

If the recipient is connected to the system, the message can be transmitted from the originator node to the recipient node. At step 314, an encryption module of the private blockchain can be executed to encrypt the message with a private blockchain encryption prior to transmission of the message from the originator node to the recipient node. At step 316, if the at least one recipient is detected to be disconnected from the system, the message can be transmitted from the originator node to the distributed storage of the public blockchain. At step 318, a listener module can be executed to detect when the at least one recipient is communicatively connected to the system. At step 320, upon detection by the listener module that the at least one recipient is communicatively connected to the system, a transmission module can be executed to transmit the message from the distributed storage of the public blockchain to the recipient node of the private blockchain.

Figure 6:
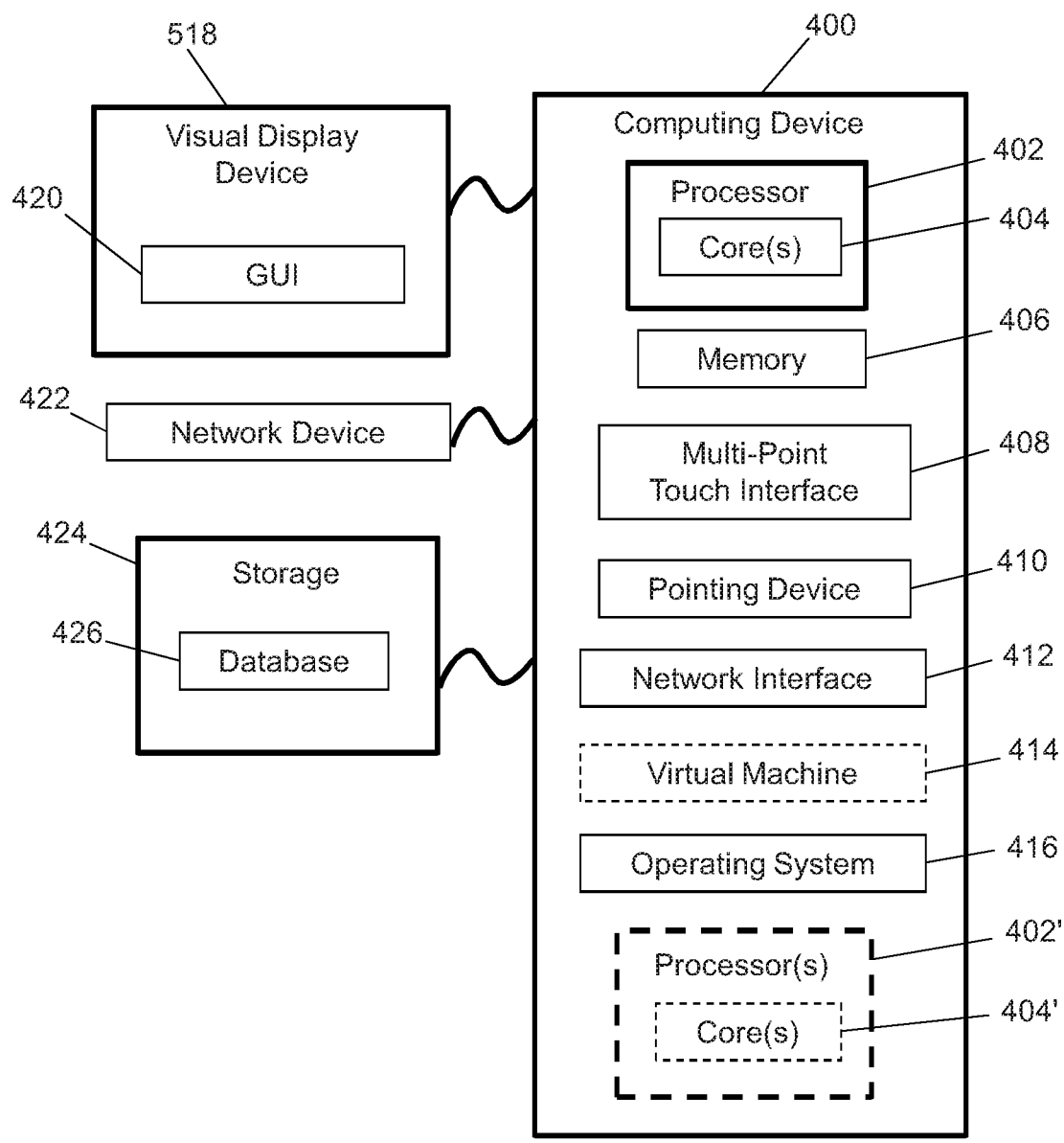
FIG. 6 is a block diagram of an exemplary computing device for implementing the exemplary blockchain-based communication system in accordance with the present disclosure.

FIG. 6 is a block diagram of a computing device 400 in accordance with exemplary embodiments of the present disclosure. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 406 included in the computing device 400 may store computer-readable and computer-executable instructions or software for implementing exemplary embodiments of the present disclosure (e.g., instructions for operating the public blockchain, instructions for operating the private blockchain, instructions for operating the processing device, instructions for operating the communication interface, instructions for operating the user interface, instructions for operating the central computing system, combinations thereof, or the like). The computing device 400 also includes configurable and/or programmable processor 402 and associated core 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' may each be a single core processor or multiple core (404 and 404') processor.

Virtualization may be employed in the computing device 400 so that infrastructure and resources in the computing device 400 may be shared dynamically. A virtual machine 414 may be provided to handle a process running on multiple processors so that the process appears to be using only one computing resource rather than multiple computing resources. Multiple virtual machines may also be used with one processor. Memory 406 may include a computer system memory or random access memory, such as DRAM, SRAM, EDO RAM, and the like. Memory 406 may include other types of memory as well, or combinations thereof.

A user may interact with the computing device 400 through a visual display device 418 (e.g., a personal computer, a mobile smart device, or the like), such as a computer monitor, which may display at least one user interface 420 (e.g., a graphical user interface) that may be provided in accordance with exemplary embodiments. The computing device 400 may include other I/O devices for receiving input from a user, for example, a camera, a keyboard, a scanner, microphone, or any suitable multi-point touch interface 408, a pointing device 410 (e.g., a mouse). The keyboard 408 and the pointing device 410 may be coupled to the visual display device 418. The computing device 400 may include other suitable conventional I/O peripherals.

The computing device 400 may also include at least one storage device 424, such as a hard-drive, CD-ROM, eMMC (MultiMediaCard), SD (secure digital) card, flash drive, non-volatile storage media, or other computer readable media, for storing data and computer-readable instructions and/or software that implement exemplary embodiments of the systems described herein. Exemplary storage device 424 may also store at least one database 426 for storing any suitable information required to implement exemplary embodiments. For example, exemplary storage device 424 can store at least one database 426 for storing information, such as data relating to the public blockchain, private blockchain, combinations thereof, or the like, and computer-readable instructions and/or software that implement exemplary embodiments described herein. The databases 426 may be updated by manually or automatically at any suitable time to add, delete, and/or update one or more items in the databases.

The computing device 400 can include a network interface 412 configured to interface via at least one network device 422 with one or more networks, for example, a Local Area Network (LAN), a Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 may include a built-in network adapter, a network interface card, a PCMCIA network card, Pa CI/PCIe network adapter, an SD adapter, a Bluetooth adapter, a card bus network adapter, a wireless network adapter, a USB network adapter, a modem or any other device suitable for interfacing the computing device 400 to any type of network capable of communication and performing the operations described herein. Moreover, the computing device 400 may be any computer system, such as a workstation, desktop computer, server, laptop, handheld computer, tablet computer (e.g., the tablet computer), mobile computing or communication device (e.g., the smart phone communication device), an embedded computing platform, or other form of computing or telecommunications device that is capable of communication and that has sufficient processor power and memory capacity to perform the operations described herein.

The computing device 400 may run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 416 may be run in native mode or emulated mode. In an exemplary embodiment, the operating system 416 may be run on one or more cloud machine instances.

Figure 7:
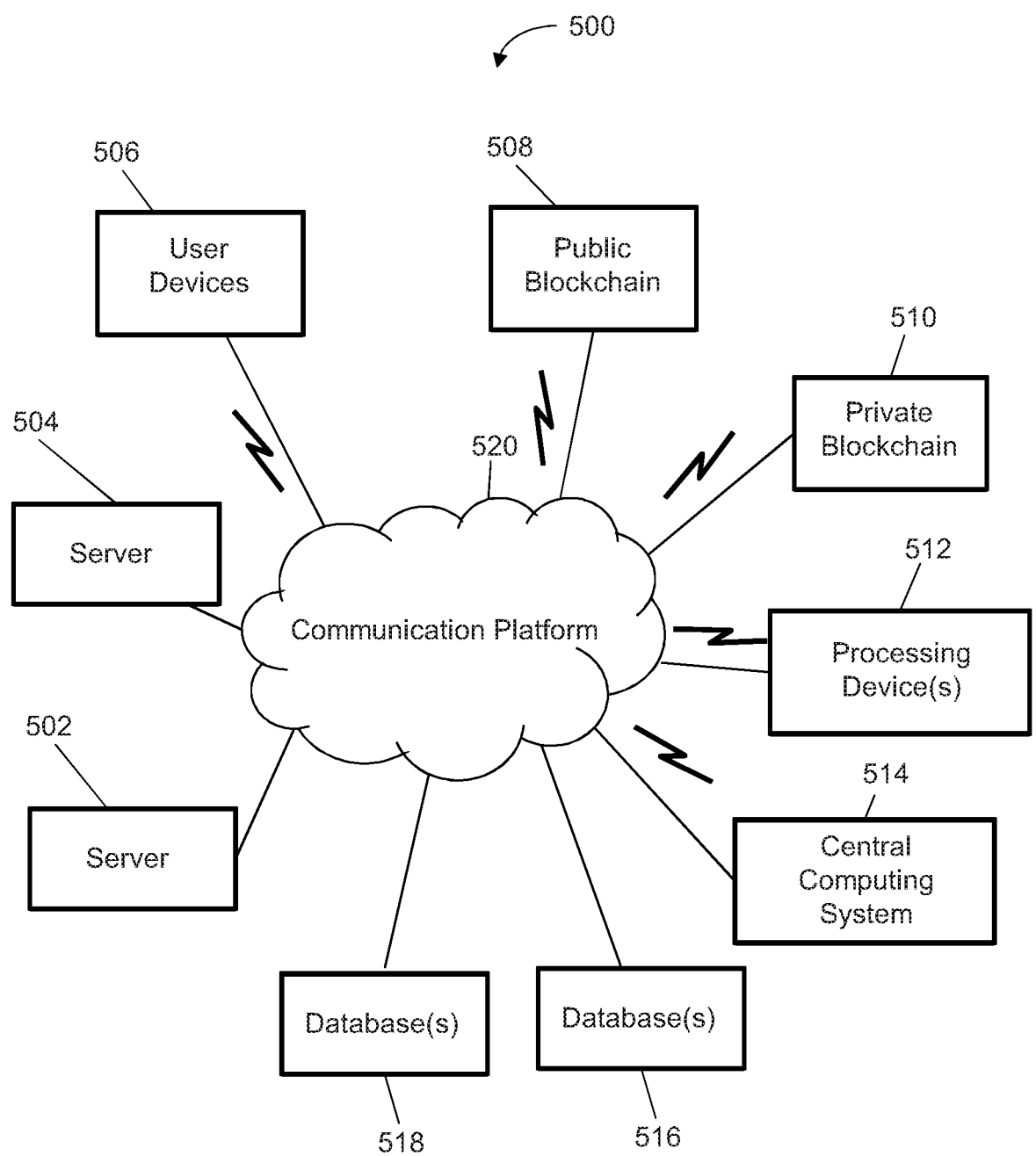
FIG. 7 is a block diagram of an exemplary blockchain-based communication system environment in accordance with the present disclosure.

FIG. 7 is a block diagram of an exemplary blockchain-based communication system environment 500 in accordance with exemplary embodiments of the present disclosure. The environment 500 can include servers 502, 504 configured to be in communication with at least user devices 506, a public blockchain 508, a private blockchain 510, processing devices 512, and a central computing system 514 via a communication platform 520, which can be any network over which information can be transmitted between devices communicatively coupled to the network. For example, the communication platform 520 can be the Internet, Intranet, virtual private network (VPN), wide area network (WAN), local area network (LAN), and the like. In some embodiments, the communication platform 520 can be part of a cloud environment.

The environment 500 can include repositories or databases 516, 518, which can be in communication with the servers 502, 504, as well as the user devices 506, the public blockchain 508, the private blockchain 510, the processing devices 512, and the central computing system 514, via the communications platform 520.

In exemplary embodiments, the servers 502, 504, the user devices 506, the public blockchain 508, the private blockchain 510, the processing devices 512, and the central computing system 514 can be implemented as computing devices (e.g., computing device 400). Those skilled in the art will recognize that the databases 516, 518 can be incorporated into at least one of the servers 502, 504. In some embodiments, the databases 516, 518 can store data relating to the public blockchain, the private blockchain, combinations thereof, or the like, and such data can be distributed over multiple databases 516, 518.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A blockchain-based communication system, comprising:
    a public blockchain including a database configured to electronically store registration data associated with an originator and at least one recipient;
    a private blockchain configured to allow for transmission of data between the originator and the at least one recipient; and
    a processing device in communication with the public blockchain and the private blockchain, the processing device configured to:
        (i) receive a request from the originator to compose a message to be transmitted from the originator to the least one recipient;
        (ii) receive as input and associate at least one digital rights management (DRM) parameter with content of the message; and
        (iii) generate a micro-blockchain within the private blockchain having an originator node associated with the originator and a recipient node associated with the at least one recipient.

2. The system of claim 1, wherein the message includes at least one of text, a photograph, a video, or a document.

3. The system of claim 1, wherein the processing device is configured to execute a validation module of the private blockchain to validate the at least one recipient selected by the originator based on the registration data of the public blockchain.

4. The system of claim 1, wherein the processing device is configured to execute a validation module of the private blockchain to detect if the at least one recipient selected by the originator is communicatively connected to the system.

5. The system of claim 4, wherein if the at least one recipient is detected to be communicatively connected to the system, the processing device is configured to transmit the message from the originator node to the recipient node in the micro-blockchain.

6. The system of claim 5, wherein the processing device is configured to execute an encryption module of the private blockchain to encrypt the message with a private blockchain encryption prior to transmission of the message from the originator node to the recipient node.

7. The system of claim 4, wherein if the at least one recipient is detected to be disconnected from the system, the processing device is configured to transmit the message from the originator node to a distributed storage of the public blockchain.

8. The system of claim 7, wherein the processing device is configured to execute a listener module to detect when the at least one recipient is communicatively connected to the system.

9. The system of claim 8, wherein upon detection by the listener module that the at least one recipient is communicatively connected to the system, the processing device is configured to execute a transmission module to transmit the message from the distributed storage of the public blockchain to the recipient node.

10. The system of claim 7, wherein the processing device is configured to execute an encryption module of the public blockchain to encrypt the message with a public blockchain encryption prior to storage of the message in the distributed storage of the public blockchain.

11. The system of claim 1, wherein the at least one DRM parameter includes an immutable characteristic, an ephemeral characteristic, or a control characteristic of the message.

12. The system of claim 11, wherein an originator control of the control characteristic allows for editing or deletion of the message by only the originator after transmission of the message from the originator node to the recipient node.

13. The system of claim 11, wherein an individual control of the control characteristic allows for editing or deletion of the message by an individual initiating transmission of the message.

14. The system of claim 11, wherein a consensus control of the control characteristic allows for editing or deletion of the message by a consensus of the originator and the at least one recipient.

15. A method for blockchain-based communication, comprising:
 providing a blockchain-based communication system including a public blockchain and a private blockchain, the public blockchain including a database configured to electronically store registration data associated with an originator and at least one recipient, the private blockchain configured to allow for transmission of data between the originator and the at least one recipient;
 receiving a request via a processing device from the originator to compose a message to be transmitted from the originator to the at least one recipient, the processing device in communication with the public blockchain and the private blockchain;
 receiving as input and associating at least one digital rights management (DRM) parameter with content of the message using the processing device; and
 generating a micro-blockchain with the processing device within the private blockchain having an originator node associated with the originator and a recipient node associated with the at least one recipient.

16. The method of claim 15, comprising executing a validation module of the private blockchain with the processing device to detect if the at least one recipient selected by the originator is communicatively connected to the system.

17. The method of claim 16, comprising transmitting the message from the originator node to the recipient node in the micro-blockchain if the at least one recipient is detected to be communicatively connected to the system.

18. The method of claim 16, comprising transmitting the message from the originator node to a distributed storage of the public blockchain if the at least one recipient is detected to be disconnected from the system.

19. The method of claim 18, comprising:
 executing a listener module to detect when the at least one recipient is communicatively connected to the system; and
 upon detection by the listener module that the at least one recipient is communicatively connected to the system, executing a transmission module to transmit the message from the distributed storage of the public blockchain to the recipient node.

20. A non-transitory computer-readable medium storing instructions for blockchain-based communication that are executable by a processing device, wherein execution of the instructions by the processing device causes the processing device to:
 provide a blockchain-based communication system including a public blockchain and a private blockchain, the public blockchain including a database configured to electronically store registration data associated with an originator and at least one recipient, the private blockchain configured to allow for transmission of data between the originator and the at least one recipient;
 receive a request via the processing device from the originator to compose a message to be transmitted from the originator to the least one recipient, the processing device in communication with the public blockchain and the private blockchain;
 receive as input and associate at least one digital rights management (DRM) parameter with content of the message using the processing device; and
 generate a micro-blockchain with the processing device within the private blockchain having an originator node associated with the originator and a recipient node associated with the at least one recipient.

* * * * *